United States Patent [19]
Hirata et al.

[11] Patent Number: 5,339,245
[45] Date of Patent: Aug. 16, 1994

[54] SYSTEM FOR DETECTING COMBUSTION STATE IN INTERNAL COMBUSTION ENGINE

[75] Inventors: Yoshihiko Hirata, Oobu; Koji Sakakibara, Hekinan, both of Japan

[73] Assignee: Nippondenso Co., Ltd., Kariya, Japan

[21] Appl. No.: 812,109

[22] Filed: Dec. 23, 1991

[30] Foreign Application Priority Data

Dec. 26, 1990 [JP] Japan .................................. 2-406994

[51] Int. Cl.$^5$ .................... F02P 5/14; G06F 15/48; G06G 7/70
[52] U.S. Cl. .................... 364/431.08; 364/431.07; 364/431.03; 123/425; 123/435; 73/115; 73/116
[58] Field of Search .................. 364/431.08, 431.07; 123/425, 117, 115, 419, 435, 422, 480; 73/115, 116, 117, 35

[56] References Cited

U.S. PATENT DOCUMENTS

| | | | |
|---|---|---|---|
| 4,274,379 | 6/1981 | Iwata et al. | 123/425 |
| 4,404,841 | 9/1983 | Franke et al. | 73/35 |
| 4,513,716 | 4/1985 | Haraguchi et al. | 123/425 |
| 4,596,217 | 6/1986 | Bonitz et al. | 123/425 |
| 4,710,881 | 12/1987 | Mouri et al. | 364/431.08 |
| 4,711,212 | 12/1987 | Haraguchi et al. | 123/425 |
| 4,903,665 | 2/1990 | Washino et al. | 123/435 |
| 5,076,098 | 12/1991 | Miwa | 73/115 |
| 5,190,011 | 3/1993 | Hashimoto et al. | 123/425 |

FOREIGN PATENT DOCUMENTS

| | | |
|---|---|---|
| 3506114 | 9/1986 | Fed. Rep. of Germany . |
| 60-35238 | 2/1985 | Japan . |
| 60-45750 | 3/1985 | Japan . |
| 60-138427 | 7/1985 | Japan . |
| 63-70143 | 3/1988 | Japan . |
| 145967 | 2/1989 | Japan . |
| 8911088 | 11/1989 | PCT Int'l Appl. . |

Primary Examiner—Thomas G. Black
Assistant Examiner—Jacques Harold Louis-Jacques
Attorney, Agent, or Firm—Cushman, Darby & Cushman

[57] ABSTRACT

A combustion state detecting system for an internal combustion engine which is equipped with a combustion state detector for detecting a combustion state of said engine. The system also includes an amplifier having a plurality of amplification factors to amplify or attenuate a combustion signal obtained by the combustion state detector, the amplification factor of the amplifier being arranged to be switchable plural times on the basis of a detection result of the combustion state detector within a predetermined time period of a combustion cycle of the engine. The decision of the combustion state of the engine is made on the basis of an output of the amplifier generated within the predetermined time period. This arrangement allows an A/D converter to input a signal having as great as possible without overflow to improve the detection accuracy of the combustion state of the engine.

2 Claims, 9 Drawing Sheets

SYSTEM FOR DETECTING COMBUSTION STATE IN INTERNAL COMBUSTION ENGINE

BACKGROUND OF THE INVENTION

The present invention relates to a combustion state detecting system for use in an internal combustion engine.

As one of conventional systems for detecting the combustion state in an internal combustion engine, there is known a knock detecting apparatus which is arranged to detect the knocking state of an internal combustion engine. In this knock detecting apparatus, the knock detecting operation is effected such that the signal generated from a knock sensor provided in the internal combustion engine is converted by an A/D converter into digital data which is in turn processed through a microcomputer so as to detect the occurrence of knock in the internal combustion engine. In this case, in order to propagate the output signal of the knock sensor to the microcomputer with a high accuracy, a signal whose level is arranged to be as high as possible within a range that does not cause the overflow is required to be inputted to the A/D converter. However, the level of the output signal of the knock sensor is greatly affected by the rotational speed of the internal combustion engine where the knock sensor is provided. For instance, in the case that the rotational speed of the internal combustion engine is in a low state, the output signal level of the knock sensor is extremely low, and on the other hand, when the rotational speed of the engine increases, the output signal level becomes extremely high. Thus, the knock detecting apparatus is required to be equipped with an amplifier having a plurality of amplification factors to amplify or attenuate the output signal thereof. Conventionally, the switching control of the amplification factor in the amplifier is performed on the basis of the maximum value (knock strength value) of the output signal of the knock sensor as disclosed in the Japanese Patent provisional Publication No. 64-45967.

Furthermore, as a different system for detecting a combustion state in an internal combustion engine, there is known an apparatus in which a cylinder internal-pressure sensor is used to detect the internal pressure in a cylinder of the internal combustion engine and the detected cylinder internal-pressure sensor signal is supplied through an A/D converter to a microcomputer to detect occurrence of misfire (for example, Japanese Patent Provisional Publication No. 60-45750).

However, in such a knock detecting apparatus, irrespective of the same operating condition that the rotational speed of the engine is constant, the output signal of the knock sensor greatly varies at every ignition cycle so that the knock strength value irregularly varies. Particularly, the knock sensor output signal at the time of the occurrence of knock becomes increased in level up to about 16 times as compared with the output signal at the time of no occurrence of knock, and in addition the knock sensor output signal irregularly and greatly varies even at the same knock decision interval. Accordingly, there is a problem which arises such a conventional amplification-factor switching control apparatus in that the amplification factor is required to be set to a relatively low value for prevention of the overflow so that difficulty is encounter to effectively detect the knock. Similarly, there is a problem which arises with the apparatus for detecting misfire on the basis of the internal pressure in the cylinder of the internal combustion engine in that the amplification factor for the cylinder internal-pressure sensor signal is set to a relatively low value for prevention of the overflow in inputting the cylinder internal-pressure sensor signal to the A/D converter, thereby making it difficult to effectively detect the misfire due to deterioration of accuracy.

SUMMARY OF THE INVENTION

It is therefore an object of the present invention to provide a combustion state detecting system for an internal combustion engine which is equipped with an amplification-factor switching apparatus whereby a signal whose level is set to be as high as possible within a range in which the overflow does not occur can be inputted to an A/D converter.

In accordance with the present invention, there is provided a combustion state detecting system for an internal combustion engine, comprising combustion state detecting means for detecting a combustion state of the engine, amplifying means having a plurality of amplification factors to amplify or attenuate a combustion signal obtained by the combustion state detecting means, amplification-factor switching means for switching the amplification factor of the amplifying means plural times on the basis of a detection result of the combustion state detecting means within a continuous time period of a combustion cycle of the engine, and combustion state decision means for deciding a combustion state of the engine on the basis of an output of the amplifying means generated within the time period.

Preferably, the combustion state detecting means is composed of a knock sensor for detecting knock vibration of the engine, and the amplification-factor switching means switches the amplification factor within the time period on the basis of a local maximum value Vad of an output signal of the knock sensor in a predetermined period of a waveform of the knock sensor output signal. Or, the combustion state detecting means is composed of a cylinder internal-pressure sensor for sensing an internal pressure of a cylinder of the engine, and the amplification-factor switching means switches the amplification factor plural times within the time period on the basis of a local maximum value of an output signal of the cylinder internal-pressure sensor at every predetermined crank angle. Further, the combustion signal is in an increasing tendency or decreasing tendency and switches the amplification factor plural times within the time period on the basis of the decision result.

In accordance with the present invention, there is further provided a combustion state detecting system for an internal combustion engine, comprising: a knock sensor for sensing knock vibration of the engine to output a knock signal having an amplitude corresponding to the sensed knock vibration; amplifying means for amplifying the knock signal with a plurality of different amplification factors; rotational speed detecting means for detecting a rotational speed of the engine; decision interval setting means for setting, on the basis of a detection result of the rotational speed detecting means, a continuous time period of a combustion cycle of the engine as a decision interval taken for switching the amplification factor; amplification-factor switching means for switching the amplification factor of the amplifying means plural times within the decision interval in accordance with the amplitude of the knock signal; and knock-state decision means for deciding a knock state of the engine on the basis of an output of the amplifying means generated within the decision interval.

Preferably, the amplification-factor switching means includes amplification-factor selecting means having a predetermined reference value so that the reference value compared with the amplitude of the knock signal to select the amplification factor of the amplifying means in accordance with the comparison result and amplification-factor correcting means for correcting the amplification factor selected by the amplification-factor selecting means within the decision interval to take a different amplification factor.

Still further, according to the present invention, there is provided a signal processing system comprising; a detector for outputting a wave-like analog detection signal; an amplifier having a plurality of amplification factors for amplifying an amplitude of the analog detection signal of the detector; an A/D converter for inputting a portion of an analog output signal of the amplifier within a predetermined interval and for converting the inputted signal into a digital signal; and a signal processing circuit for outputting switching signals on the basis of the digital signal outputted from the A/D converter so as to switch the amplification factor of the amplifier plural times within the predetermined interval.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
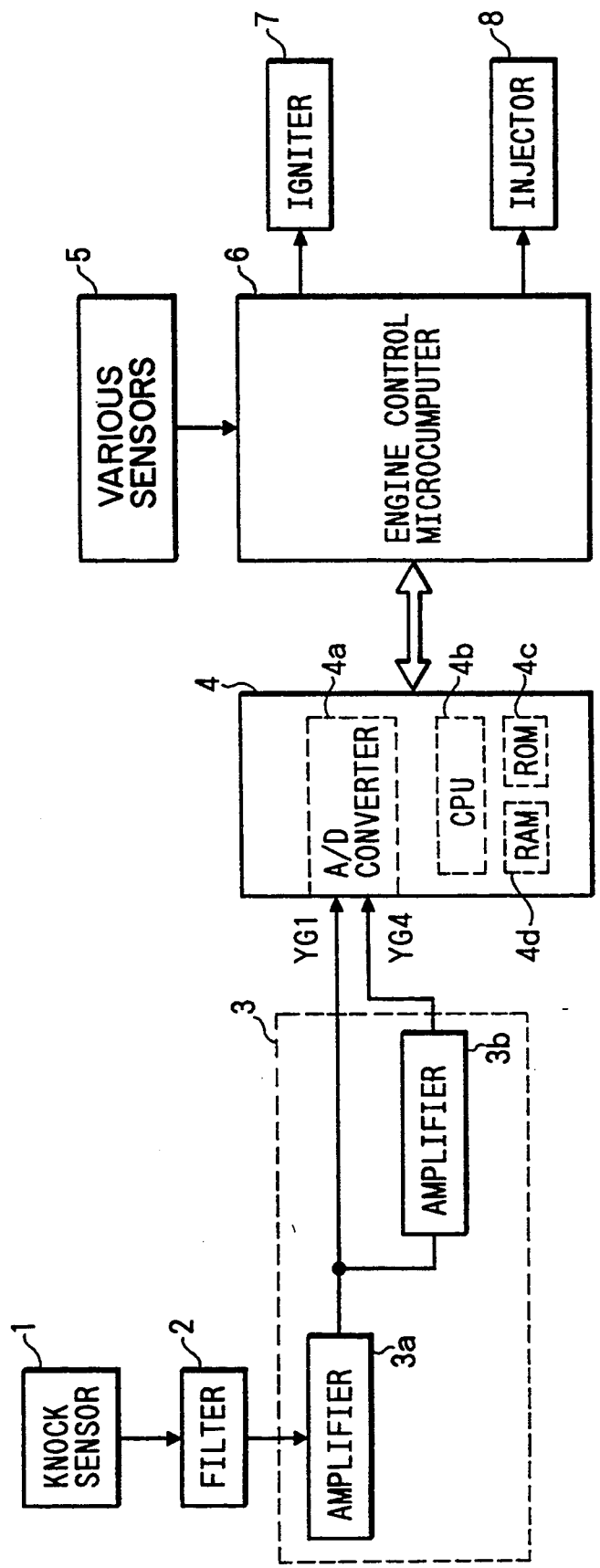
FIG. 1 is a block diagram showing the entire arrangement of a combustion state detecting system for an internal combustion engine according to a first embodiment of the present invention.

FIG. 1 illustrates the entire arrangement of an embodiment of the present invention. In FIG. 1, illustrated at numeral 1 is a knock sensor which is disposed on a cylinder block of an internal combustion engine, not shown, so as to act as a knock detecting means for detecting vibration of the internal combustion engine due to occurrence of the knock, and designated at numeral 2 is a filter for eliminating a noise component of the detection signal of the knock sensor 1 to extract a signal only having a frequency inherent to the knock at the occurrence of the knock. Further, numeral 3 depicts an amplifying circuit for amplifying the signal extracted by the filter 2. The amplifier 3 is composed of first and second amplifiers 3a and 3b so as to obtain a first knock signal due to only the first amplifier 3a and a second knock signal due to both the amplifiers 3a and 3b. Here, in this embodiment the amplification factor of the circuit for obtaining the aforementioned second knock signal is set to 4 times of the amplification factor of the first amplifier 3a for obtaining the first knock signal. Further, the first and second knock signals obtained by the amplifying circuit 3 respectively supplied to input ports YG1 and YG4 of A/D converter of a knock detection microcomputer 4. The knock detection microcomputer (which will be referred hereinafter to as knock ECU) 4 is constructed as an amplification-factor switching means and a combustion-state decision means and comprises an A/D converter 4a for converting the knock signals, inputted through the input ports YG1 and YG4, from the analog signals into the corresponding digital signals, a CPU 4a for performing the calculation process to decide the occurrence of the knock on the basis of the output signals of the A/D converter 4a, a read-only memory unit (ROM) 4c for in advance storing control constants necessary for the control program and calculation, and a temporary memory unit (RAM) 4d for temporarily storing the calculation data when the CPU 4b is in operation.

Furthermore, numeral 5 represents various sensors such as a crank angle sensor, a pressure sensor and water temperature sensor for sensing the state of the internal combustion engine and the state of a motor vehicle on which the engine is mounted, numeral 6 designates an internal combustion engine control microcomputer (which will be referred hereinafter to as engine ECU) for performing the calculation process to control the fuel injection quantity and the ignition timing for the engine on the basis of a knock decision signal from the above-mentioned knock ECU 4 and the detection signals of the various sensors 5. Moreover, numeral 7 denotes an igniter for generating a high voltage at an optimal ignition timing on the basis of the signal from the engine ECU 6 and for applying the high voltage to an ignition plug of the engine, not shown, and numeral 8 is an injector for similarly determining an optimal fuel injection quantity on the basis of the signal from the engine ECU 6 and for supplying the fuel into the engine.

Here, although in the amplifying circuit 3 of this embodiment the amplification factor of the amplifier 3b is set so that the amplification factor of the circuit for obtaining the second knock signal is 4 times of the amplification factor for the first knock signal, this invention is not limited to the 4 times. Further, although in this embodiment is set the amplifying circuit 3 whose amplification factor is switchable between two steps, it is appropriate to use an amplifying circuit whose amplification factor is switchable between a plurality of (three or more) steps.

Figure 2:
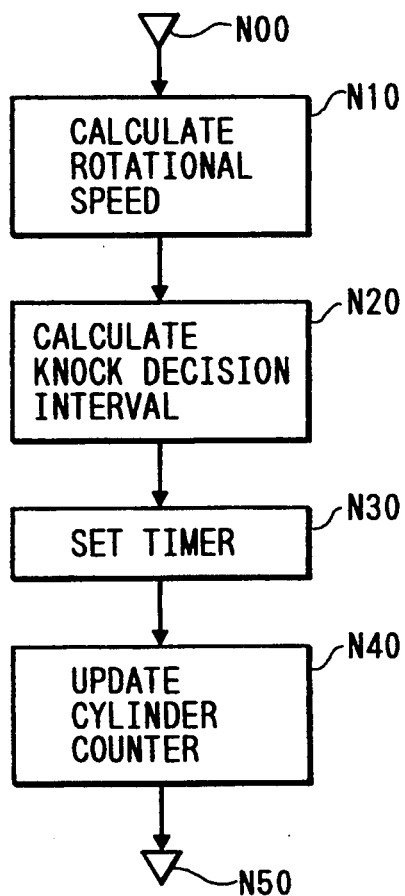
FIGS. 2 and 3 are flow charts for describing operation of the FIG. 1 combustion state detecting system.

FIG. 2 shows an external interrupt routine, the interrupt timing being taken at BTDC (before top dead center) 10° CA of the internal combustion engine, for example. This interrupt routine starts with a step N00, then followed by a step N10 to calculate the rotational speed of the internal combustion engine on the basis of the time from the previous interrupt to the present interrupt. Further, a subsequent step N20 is provided in order to calculate an adequate knock decision interval (for example, BTDC 10° CA to 90° CA) on the basis of the rotational speed information calculated in the step N10, then followed by a step N30 to set a timer so that the timer interrupt occurs at the start timing of the knock decision interval calculated in the step N20. A step N40 is for performing a process whereby the cylinder count is set with respect to the cylinder for the knock decision (the cylinder count is updated), thereafter returning through a step N50 to a main routine which will be described hereinafter.

Figure 3:
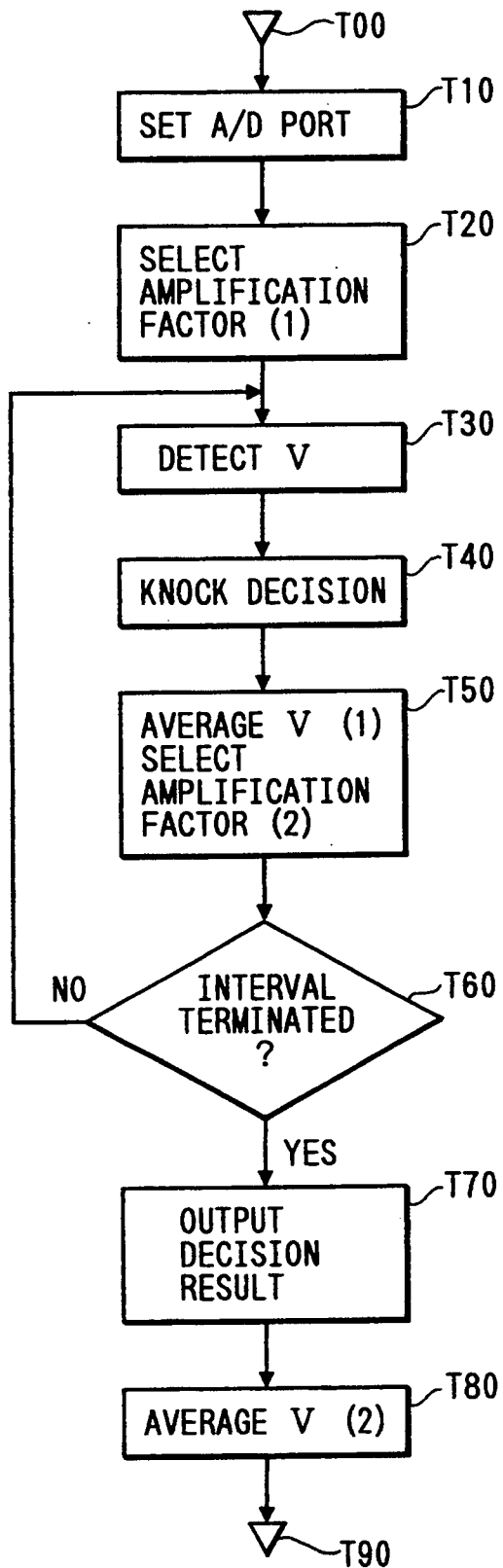

FIG. 3 illustrates a timer interrupt routine which starts with a step T00 in response to the interrupt time set in the FIG. 2 routine and which is repeatedly performed within the knock decision interval set in the FIG. 2 routine (for example, every timing elapsed by a quarter wavelength after the knock signal waveform is shifted from the minus side to the plus side).

Figure 4:
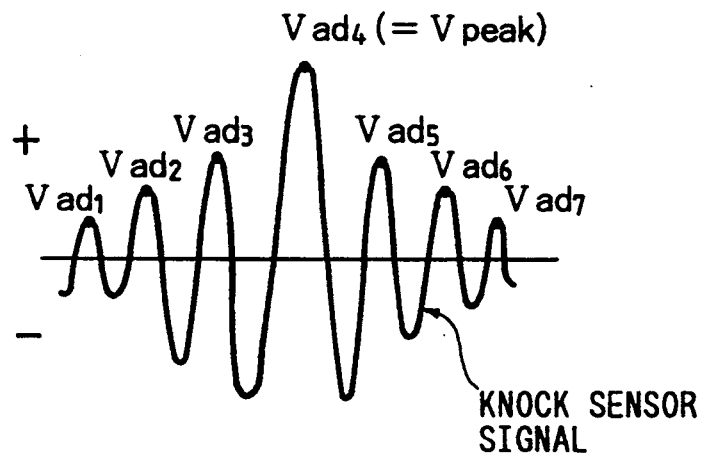
FIG. 4 shows a waveform of a knock sensor signal.

In FIG. 3, a port of the A/D converter 4a is set in a step T10 and an initial amplification factor of the amplifying circuit 3 is set in a step T20. The method of setting the initial amplification factor in the step T20 will hereinafter be described in detail. A step T30 is for detecting a knock strength value V. This knock strength value V represents the local maximum values Vadj (j=1, 2, ... , n) in a knock sensor signal as illustrated in FIG. 4, for example, and further designates the maximum value Vpeak of the local maximum values Vadj. A step T40 follows to check whether knock occurs or not. Here, for instance, the local maximum value Vad in the knock sensor signal is compared with a knock decision value Vref in accordance with a routine, not shown, to count the number CPLS of times of Vad≧Vref and the count result is stored in the RAM 4d so that the total number of the CPLS counted is stored therein at the time of the termination of the decision interval. The determination of occurrence of the knock is made in a step T70 (which will be described hereinafter) when the CPLS is above a predetermined value. Subsequently, a step T50 is executed to perform the first averaging process of the local maximum value Vad detected in the step T30 and further to perform the switching process of the amplification factor of the amplifying circuit 3. These processes of the step T50 will hereinafter be described in detail. A step T60 is provided in order to check whether the knock decision interval is terminated. If not, the optical flow returns to the step T30, and if terminated, the operational flow goes to the above-mentioned step T70. In the step T70 the decision of the occurrence of the knock is made when the CPLS exceeds a predetermined value, this decision result being inputted to the engine ECU 6.

In a subsequent step T80 the second averaging process of Vad is performed in accordance with the following equation:

$$V_{mean} = V_{meanj-1} + (V_{mad} - V_{meanj-1})/4$$

where Vmad is a value calculated in the first averaging process which will be described hereinafter.

After the execution of the step T80, the operational flow returns through a step T90 to the main routine.

Figure 5:
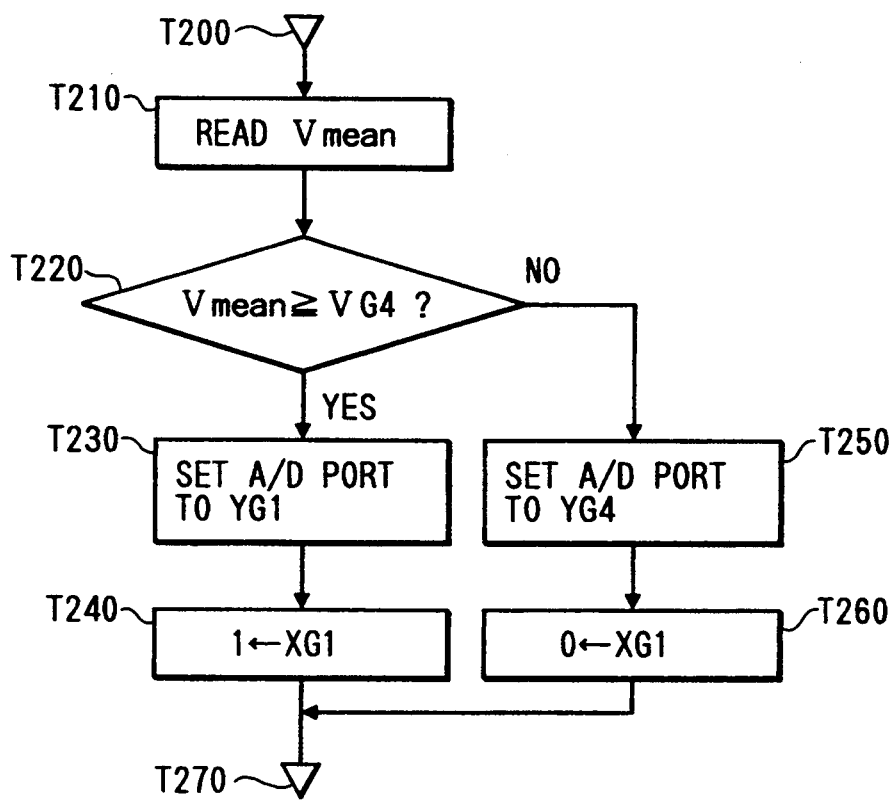
FIGS. 5 and 6 are flow charts showing detailed processes of portions of the operation to be executed in the FIG. 3 routine.

FIG. 5 illustrates the detailed operation in the above-mentioned step T20 which is a routine for setting the initial amplification factor for the knock sensor signal at the current knock detection interval. This routine begins with a step T200. A step T210 is provided to read, from the RAM 4d, the final second averaged value Vmean at the previous knock decision interval in terms of the cylinder which is the current controlled object. A step T220 follows to compare this averaged value Vmean with a predetermined value VG4 which is a reference level for switching the amplification factor. If Vmean is equal to or greater than VG4, the operational flow advances to a step T230, and if not, the operational flow goes to a step T250.

In the step T230, the input port of the A/D converter is set to the YG1 side, then followed by a step T240 to set an A/D flag XG1 for each of the cylinders to "1" indicative of the fact that the input port thereof has been set to the YG1 side, thereafter proceeding to a step T270 to terminate this routine. On the other hand, in the step T250 the input port of the A/D converter 4a is set to the YG4 side, then followed by a step T260 to set the A/D flag XG1 to "0", thereafter advancing to the aforementioned step T270 to terminate this routine.

Figure 6:
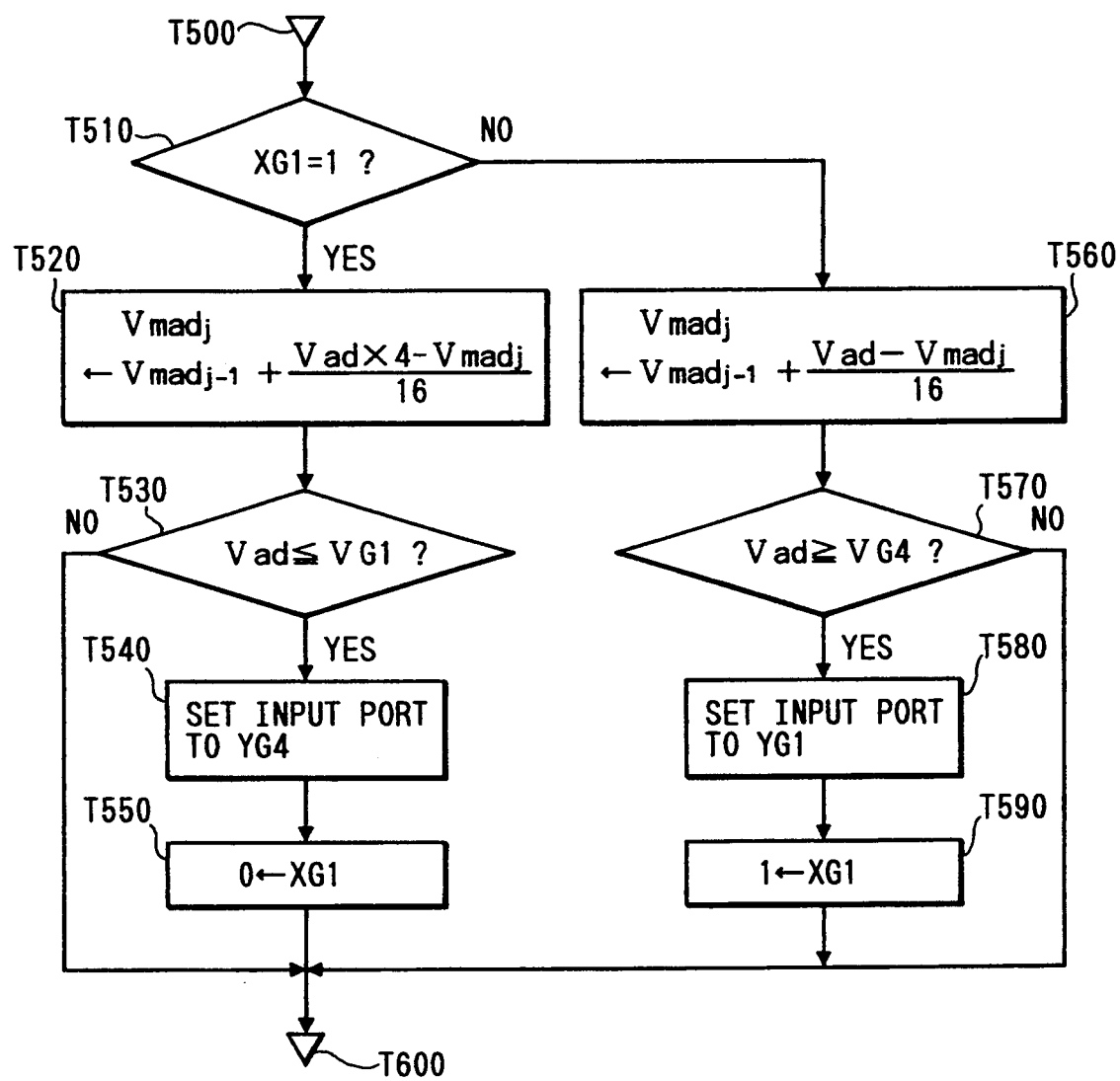

FIG. 6 is an illustration of the process in the step T50 in the FIG. 3 routine which is a principal portion of the operation in this invention. This process starts with a step T500, then followed by a step T510 to check the flag XG1 set in the above-described FIG. 5 process to determine whether nor not the amplification factor is 1 (that is, whether the A/D port is set to the YG1 side). When the flag XG1 is "1", the decision is made such that the amplification factor is 1 (one time), then followed by a step T520. On the other hand, when the flag XG1 is "0", the decision is made such that the amplification factor is 4, then followed by a step 560.

In the step T520 the first averaging process is effected in accordance with the following equation:

$$V_{madj} = V_{madj-1} + (V_{ad} \times 4 - V_{madj})/16$$

Here, since in the step T520 the amplification factor for amplifying the knock sensor signal is 1, the averaging process is performed after the knock strength value Vad is multiplied by 4.

In a subsequent step T530, the knock strength value Vad is compared with a predetermined value VG1. If the knock strength value Vad is below the predetermined value VG1, the operational flow goes to a step T540 to set the input port of the A/D converter 4a to the YG4 side, then followed by a step T550 to set the flag XG1 to "0" and further followed by a step T600 to terminate this routine. On the other hand, if the knock strength value Vad is not below the predetermined value VG1, the operational flow directly goes to the step T600 to terminate this routine.

Returning to the step T510, when the decision is made such that the flag XG1 is not set to "1", the operational flow advances to the step T560 to perform the first averaging process in accordance with the following equation:

$$V_{madj} = V_{madj-1} + (V_{ad} - V_{madj})/16$$

In a subsequent step T570, the knock strength value Vad is compared with a predetermined value VG4 which is a reference level for switching the amplification factor as well as the above-mentioned predetermined value VG1. If the knock strength value Vad is equal to or greater than the predetermined value VG4, the operational flow advances to a step T580 to set the input port of the A/D converter 4a to the YG1 side, then followed by a step T590 to set the flag XG1 to "0", thereafter proceeding to the step T600 to terminate this routine. On the other hand, if in the step T570 the knock strength value Vad is below the predetermined value VG4, the operational flow directly goes to the step T600 to terminate this routine.

Here, since in this embodiment the state that the A/D port is set to the YG4 side, that is, the state that the amplification factor of the amplifying circuit 3 is 4, is set as the reference state, the averaging process is effected after the knock strength value Vad is multiplied by 4 in the step T520. However, it is also appropriate that the reference state is made in the case that the A/D port is set to the YG1 side and the averaging process is executed after the knock strength value Vad is multiplied by ¼ in the step T560.

Figure 7:
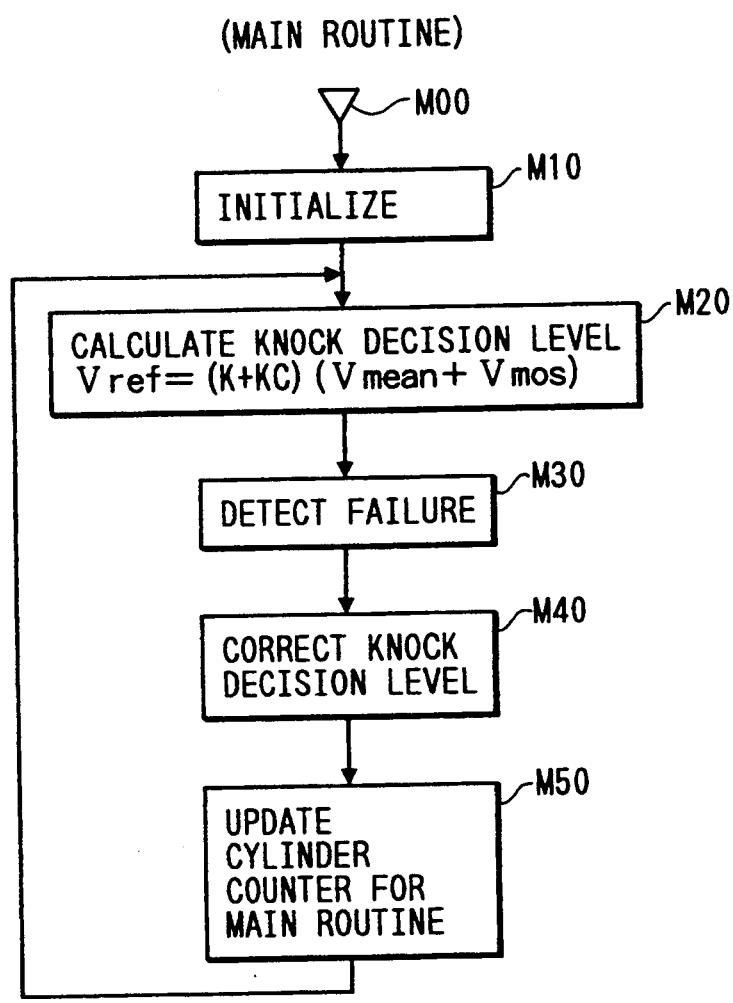
FIG. 7 is a flow chart showing a main routine to be executed in a knock electronic control unit of the FIG. 1 combustion state detecting system.

FIG. 7 is a flow chart showing a main routine for the operation to be executed in the knock ECU 4, which starts with a step M00. A step M10 is provided in order to initialize the RAM 4d and others in the knock ECU 4, then followed by a step M20 to calculate the knock decision level Vref in accordance with the following equation:

$$Vref = (K + KC) \times (Vmean + Vmos)$$

where K represents a constant set on the basis of the operating condition of the internal combustion engine, KC designates a variable for correcting the knock decision level Vref which variable is obtained in a step M40 which will be described hereinafter, Vmean depicts the second averaged value to be obtained in the Step T80 in FIG. 3, and Vmos denotes a constant for absorbing the A/D conversion error (it is appropriate to set Vmos to 0).

Subsequently, a step M30 is executed to detect the failure of the knock sensor 1 and a step M40 is executed to set the variable KC for correcting the knock decision level Vref. Further, a step M50 is executed to update the main-routine cylinder counter, before returning to the aforementioned step M20. Here, the process in the step M40 is disclosed in detail in the Japanese Patent provisional Publication No. 64-459676, and the description thereof will be omitted for brevity.

Figure 8:
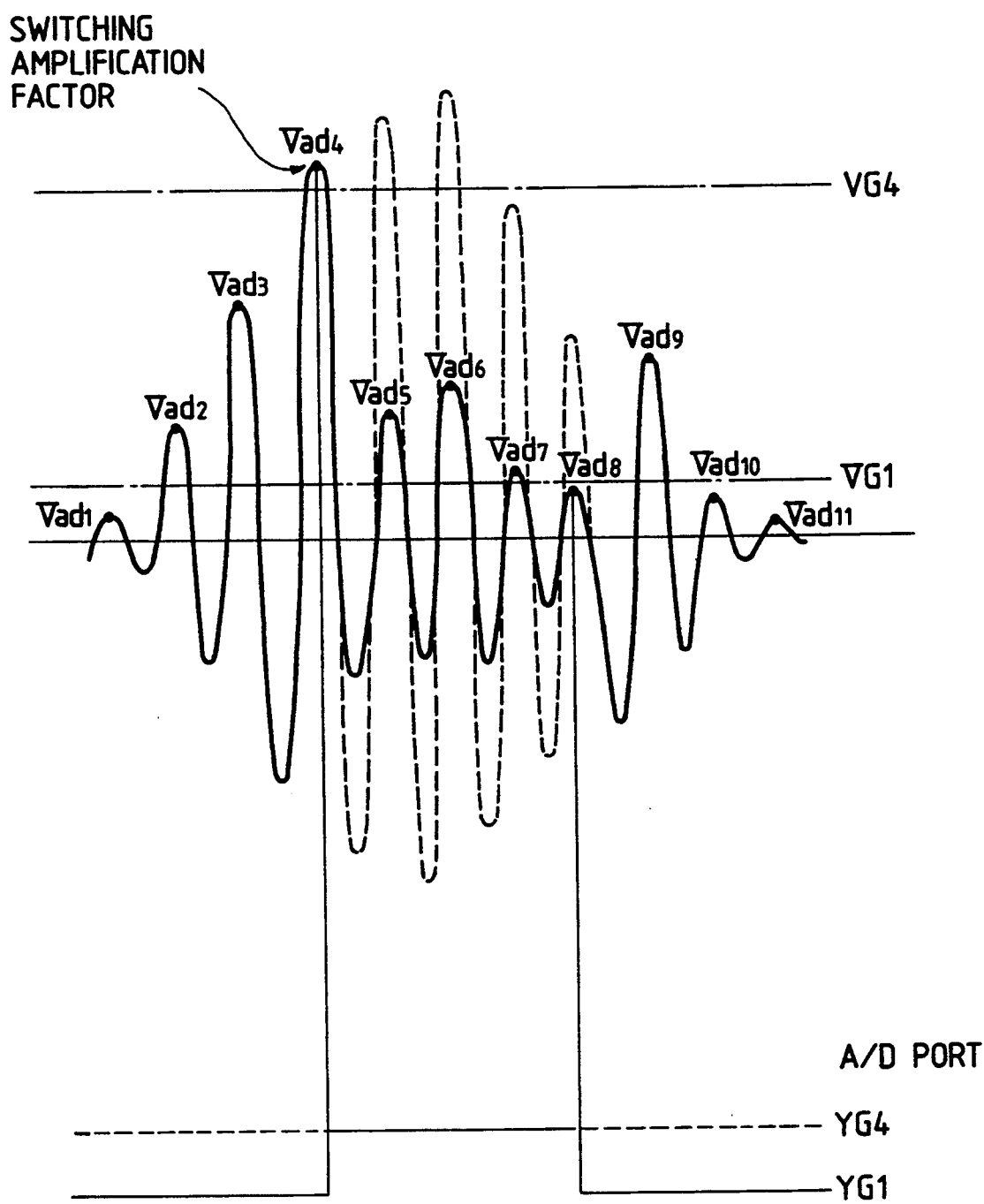
FIG. 8 is a characteristic illustration for describing the operation to be performed by the FIG. 1 system.

FIG. 8 is a graphic diagram of the characteristic of a knock sensor signal processed by the system according to this embodiment. Here, the signals amplified up to one and four times are always inputted to the input ports YG1 and YG4, respectively. In FIG. 8, the solid line represents the characteristic diagram for describing the operation in this embodiment, that is, it represents the characteristic in the case that the knock ECU 4 performs the process by switching the knock sensor signals due to two different amplification factors. On the other hand, the dotted line shows the characteristic of the knock sensor signal in the case that the amplification is constantly made with the amplification factor which is 4.

In FIG. 8, the initial amplification factor is set to be 4, and since the knock strength values Vad1, Vad2 and Vad3 are respectively smaller than the predetermined value VG4 as illustrated in FIG. 6, the amplification factor is kept to be 4. Since the next knock strength value Vad4 first exceeds the predetermined value VG4, the amplification factor is switched to be 1 at the time of the knock strength value Vad4 and then kept to 1 until the time of the knock strength value Vad8 which becomes below the predetermined value VG1. Since the previous knock strength value Vad8 is smaller than the predetermined value VG1, the amplification factor is switched to be 4 at the time of the knock strength value Vad9.

That is, since the amplification factor is arranged to be switched on the basis of the immediately-before knock strength value Vad, it is possible to switch the amplification factor plural times within the same knock decision interval and hence it is possible to surely prevent the overflow irrespective of the irregular variation of the knock sensor signal due to variation of the combustion state, misfire, occurrence of the knock and others. In addition, if adequately setting the predetermined values VG1 and VG4, the knock sensor signal can effectively be amplified to thereby utilize the maximum dynamic range of each cylinder to improve the knock detection accuracy.

Figure 9:
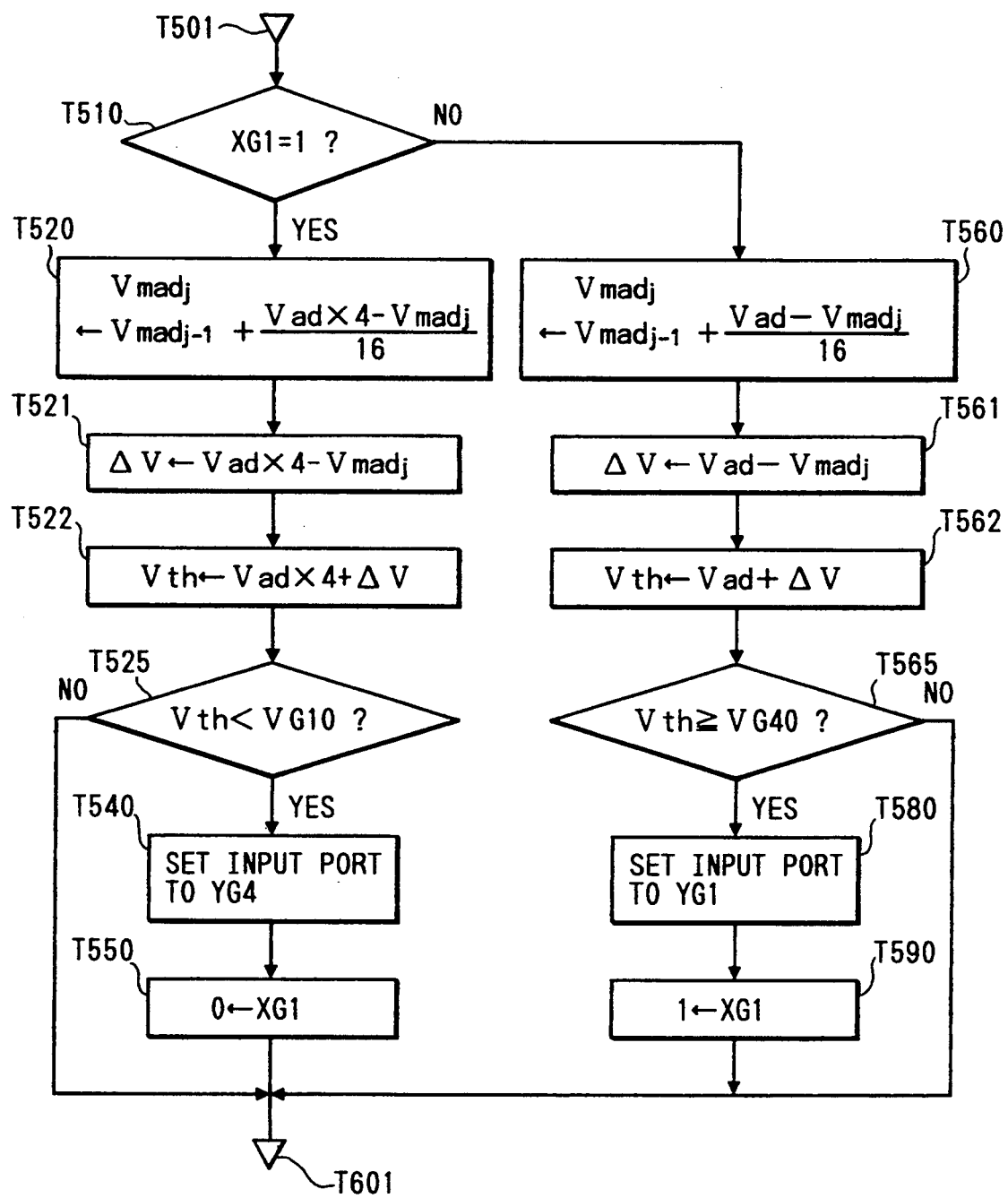
FIG. 9 is a flow chart for describing a different operation to be effected in the FIG. 1 system.

FIG. 9 shows a different operation for the step T50 in FIG. 3. Here, the processes in steps T510, 520 and 560 are the same as those in the steps designated by the same marks in FIG. 6 and hence the description thereof will be omitted for brevity. This process starts with a step T501, then followed by the step T510 whereby the decision is made such that the amplification of the amplifying circuit 3 is 1, and followed by the step T520 to perform the first averaging process, thereafter proceeding to a step T521. The step T521 is provided in order to calculate the deviation ΔV between the value obtained by multiplying the knock strength value Vad by 4 and the averaged value Vmadj obtained in the step T520. This deviation ΔV is a value indicative of whether the current knock sensor signal is in an increasing tendency or a decreasing tendency.

In a subsequent step T522, the deviation ΔV obtained in the step T521 is added to the value obtained by multiplying the knock strength value Vad by 4, thereby obtaining an addition value Vth. Further, in a step T525 this value Vth is compared with a decision value VG10 used for switching the amplification factor. If Vth is smaller than VG10, steps 540 and 550 are executed to switch the amplification factor to 4 times, thereafter proceeding to a step T601. On the other hand, if in the step T525 the value Vth is greater than the value VG10, the operational flow directly advances to the step T601. Here, the processes in the steps T540 and T550 are the same as those indicated with the same marks in the FIG. 6 routine and hence the description will be omitted.

On the other hand, when the determination of the step T510 is made such that the amplification factor of the amplifying circuit 3 is 4 times, the step T560 is executed to perform the first averaging process as well as the step T520, then followed by a step T561 so as to calculate the deviation ΔV between the knock strength value Vad and the averaged value Vmadj obtained in the step T560. In a subsequent step T562, the deviation ΔV obtained in the step T561 is added to the knock strength value Vad to calculate a value Vth, then followed by a step T565 to compare this addition value Vth with a decision value VG40 used for switching the amplification factor. If Vth is equal to or greater than VG40, steps T580 and T590 follow to switch the amplification factor to 1, then followed by the step T601 to terminate this routine. On the other hand, if in the step T565 the addition value Vth is smaller than the decision value VG40, the operational flow directly proceeds to the step T601. Here, the processes in the steps T580 and T590 are the same as those indicated with the same marks in FIG. 6 and hence the description will be omitted for brevity.

According to the above-described process, determination is made as to whether the knock sensor signal is in an increasing tendency or a decreasing tendency, and it is possible to set the amplification factor of the amplifying circuit 3 in accordance with the determination.

Figure 10:
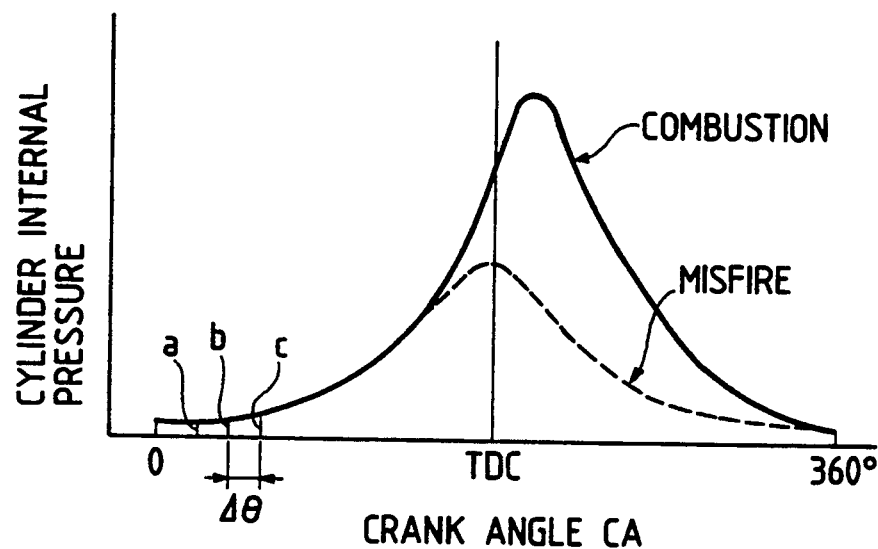
FIG. 10 is a characteristic illustration for describing a second embodiment of this invention.

Moreover, a description will be made hereinbelow with reference to FIGS. 10 and 11 in terms of a further embodiment of this invention. FIG. 10 shows an output signal waveform of a cylinder internal-pressure sensor which makes up a combustion state detecting means for detecting the internal pressure in a cylinder of the internal combustion engine. In FIG. 10, the horizontal axis represents the crank angle and the vertical axis designates the cylinder internal pressure, and further the dotted line indicates the characteristic of the cylinder internal-pressure sensor signal generated when misfire occurs in the internal combustion engine and the solid line denotes the characteristic of the cylinder internal-pressure sensor signal generated when the misfire does not occur, that is, when the combustion is completely performed. In this case, the process for decision of the misfire is effected by A/D-converting the level of the output of the cylinder internal-pressure sensor at every predetermined crank angle $\Delta\theta$ (for example, 5° CA) and then inputting the A/D-conversion result to a microcomputer. With this arrangement, as well as the above-described embodiment, the cylinder internal-pressure sensor signal can be inputted through an amplifying circuit to the A/D converter so that the overflow does not occur in the A/D converter.

Figure 11:
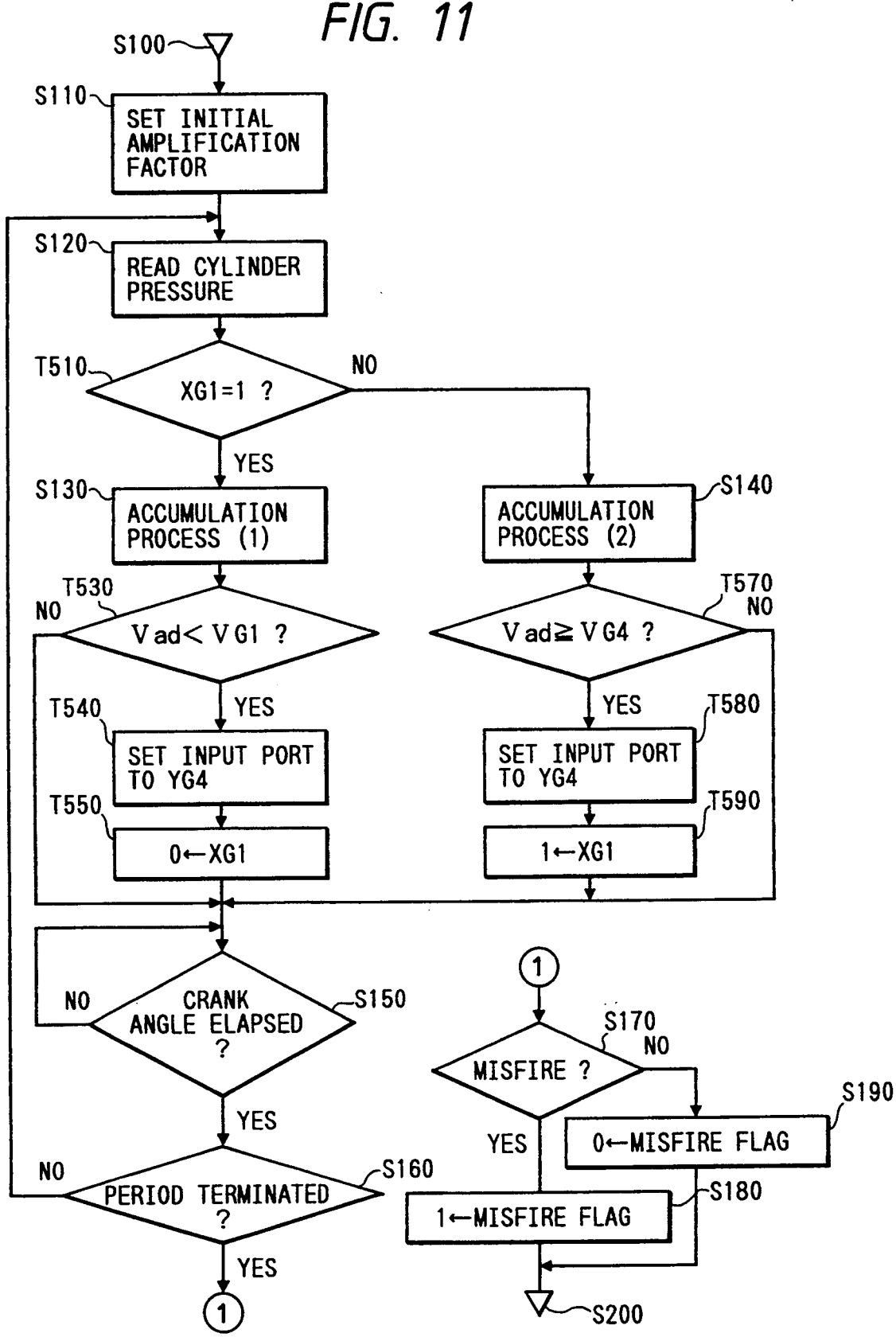
FIG. 11 is a flow chart for describing the operation to be executed in the second embodiment of this invention.

FIG. 11 is a flow chart for describing an operation of the system according to this embodiment of the present invention. This operation starts with a step S100 in response to a signal due to a misfire decision interval setting routine, not shown. A subsequent step S110 is executed to set the initial amplification factor. Here, the initial amplification is set to the maximum magnification. In this embodiment, the amplification is set to 4 times and at the same time the flag XG1 is set to "0". A step S120 is then executed to read the present cylinder internal pressure value Vad from the detection signal of the cylinder internal-pressure sensor, then followed by a step T510 to check the flag XG1, i.e., check whether the amplification factor is 1 or not. If the flag XG1 is "1", the operational flow advances to a step S130. On the other hand, if the flag XG1 is "0", the operational flow goes to a step S140. The step S130 is for performing the accumulation process to detect misfire with the cylinder internal pressure value Vad read in the step S120 being multiplied by 4, and the step S140 is for directly executing the accumulation process of the cylinder internal pressure value Vad. Here, this accumulation process is effected under the conditions that the cylinder internal pressure value Vad is negative when the corresponding cylinder is in the compression stroke and positive when it is in the expansion stroke. This process is disclosed in detail in the Japanese Patent provisional Publication No. 60-45750 and therefore the detailed description thereof will be omitted here.

After the completion of the process in the step S130, the operational flow goes to steps T530 to T550, and after the completion of the process in the step S140, the operational flow advances to steps T570 to T590. These steps T530 to T590 are the same in process as those indicated by the same marks in FIG. 6 and hence the description thereof will be omitted for brevity.

A step S150 is provided in order to check whether the current timing is for reading the cylinder internal pressure in the step S120. In this embodiment, the reading is effected at every predetermined crank angle (for example, 5° CA) and the operational flow advances to a step 160 when reaching the predetermined crank angle. The step S160 is for check whether the misfire detection interval is terminated or not. If not terminated, the operational flow returns to the step S120 to repeatedly perform the above-described processes. On the other hand, if so, a step S170 is executed to compare the accumulation process results in the steps S130 and S140 with a misfire decision value to check whether misfire occurs or not. If the decision is the occurrence of misfire, a step S170 is executed to set a misfire occurrence flag to "1", then followed by a step S200 to return to the main routine. On the other hand, if the decision in the step S170 is no occurrence of the misfire, a step S190 follows to set the misfire occurrence flag to "0", then followed by the step S200 to similarly return to the main routine. The method of determining the occurrence of misfire is disclosed in detail in the Japanese Patent provisional Publication No. 60-45750 and hence the description thereof will be omitted here. The process such as cut of fuel to the misfire occurrence cylinder can be performed at the time of the occurrence of misfire by checking the misfire occurrence flag set in the steps S180 and S190.

Although in the steps T530 and T570 the cylinder internal-pressure value Vad is compared with the predetermined value to check whether the amplification factor is switched, it is also appropriate to switch the amplification factor with the decision being made as to whether the detection signal of the cylinder internal-pressure sensor is in the increasing tendency or decreasing tendency, as well as the process in FIG. 9.

Figure 12:
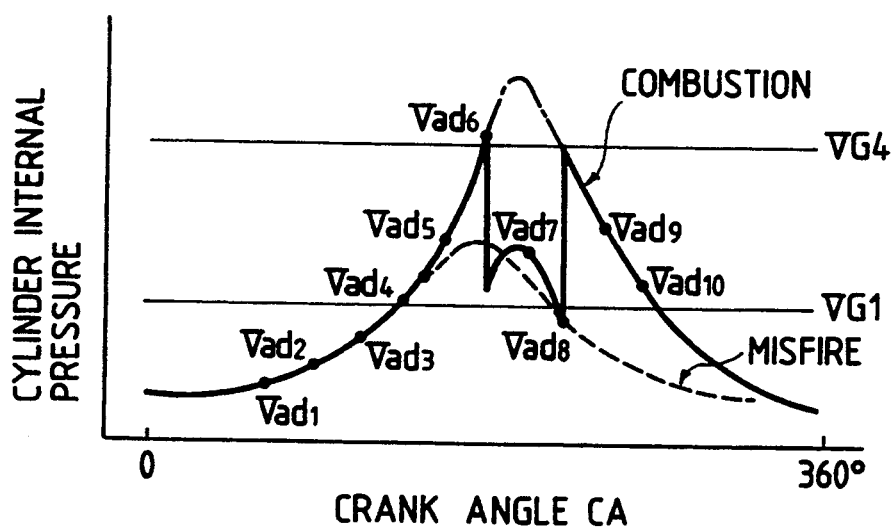
FIG. 12 is characteristic illustration useful for understanding the second embodiment of this invention.

FIG. 12 is a graphic illustration of the cylinder internal-pressure sensor signal characteristic useful for describing the operation in the FIG. 11 routine. As well as the case described with reference to FIG. 8, the initial amplification factor for the output signal (waveform) of the cylinder internal-pressure sensor at the time of the combustion, which is indicated by the solid line in the illustration, is set to 4 times. This amplification factor is kept to 4 times until the output signal value (Vad6) exceeds the predetermined value VG4. Secondly, the amplification factor is set to 1 for the time period between the output signal value Vad6 to the output signal value Vad8 which becomes below the predetermined value VG1 and, thereafter, again switched to 4.

As described above, even in the misfire detecting system using the cylinder internal-pressure sensor signal, with the amplification factor being switched within one combustion interval, it is possible to utilize the maximum dynamic range of the A/D converter, thereby improving the accuracy of the misfire detection.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A combustion state detecting system for an internal combustion engine, comprising:
   combustion state detecting means for detecting a combustion state of said engine and for outputting a continuous detection signal being indicative thereof, where said detection signal includes a plurality of detection signal portions per combustion cycle;

amplifying means for amplifying said detection signal with one of a plurality of selectable different amplification factors;

amplification-factor switching means for selecting an amplification factor for said amplifying means on the basis of a value of a current portion of said detection signal within a continuous time period of a combustion cycle of said engine, where said amplifying means uses said amplification factor corresponding to said current portion of said detection signal within a current combustion cycle for amplifying a next portion of said detection signal within said current combustion cycle, thereby changing said amplification factor more than once per combustion cycle; and combustion state decision means for performing an analog-to-digital conversion on each of said amplified portions of said detection signal, thereby obtaining a local maximum value corresponding to each of said amplified portions, and for deciding about the combustion state of said engine on the basis of a comparison between each of said local maximum values within said continuous time period and a threshold value, wherein said local maximum value is compared with said first and second predetermined values so that a gain for the next analog-to-digital conversion is decreased when said local maximum value is greater than said first predetermined value in a high-gain state and increased when said local maximum value is smaller than said second predetermined value in a gain-decreased state, said second predetermined value being set to be smaller than said first predetermined value, and the analog-to-digital conversion value and information relating to the gain are stored and used for calculation.

2. A system as claimed in claim 1, wherein said decision signal at the time of the next analog-to-digital conversion is estimated on the basis of whether the detection signal has a decreasing or increasing tendency so that the estimated decision signal is compared with a third predetermined value so as to switch the gain on the basis of the comparison result.

* * * * *